United States Patent [19]

Lenda

[11] 4,343,410
[45] Aug. 10, 1982

[54] ANTI-SIPHON DEVICE

[75] Inventor: Donald E. Lenda, Williamsville, N.Y.

[73] Assignee: Warehouse Bus Parts, Inc., Cheektowaga, N.Y.

[21] Appl. No.: 218,839

[22] Filed: Dec. 22, 1980

[51] Int. Cl.³ .............................................. B65B 3/06
[52] U.S. Cl. .............................. 220/86 AT; 220/86 R
[58] Field of Search ..................... 220/86 R, 86 AT; 138/40

[56] References Cited

U.S. PATENT DOCUMENTS

| | | | |
|---|---|---|---|
| 1,512,065 | 10/1924 | Taylor | 220/86 AT |
| 1,925,079 | 9/1933 | Allred | 220/86 R |
| 2,017,837 | 10/1935 | Anschicks | 220/86 AT |
| 2,099,558 | 11/1937 | Dibelka et al. | 220/86 R |
| 2,133,520 | 10/1938 | Ritz-Woller | 220/86 R |
| 2,147,755 | 2/1939 | Roberts | 220/86 R |
| 2,165,357 | 7/1939 | Emmert | 220/86 R |
| 2,313,266 | 3/1943 | Roberts | 220/86 AT |
| 2,496,992 | 2/1950 | Glidden | 220/86 AT |
| 3,951,297 | 4/1976 | Martin | 220/86 AT |

*Primary Examiner*—William Price
*Assistant Examiner*—Gary E. Elkins
*Attorney, Agent, or Firm*—Christel, Bean & Linihan

[57] ABSTRACT

An anti-siphoning device for preventing the siphoning of fuel. The device is adapted for permanent installation within the intake pipe of a fuel tank, and comprises a coiled, hourglass-shaped spring mounted within a three prong tubular cage. Once installed, the bottom end of the device housing the spring is positioned such that a substantial portion of the spring lies below the end of the filler pipe and projects downwardly into the fuel tank. This arrangement permits the rapid entry of fuel into the tank, while preventing any attempt to remove fuel via the insertion of a siphoning hose or tube.

20 Claims, 5 Drawing Figures

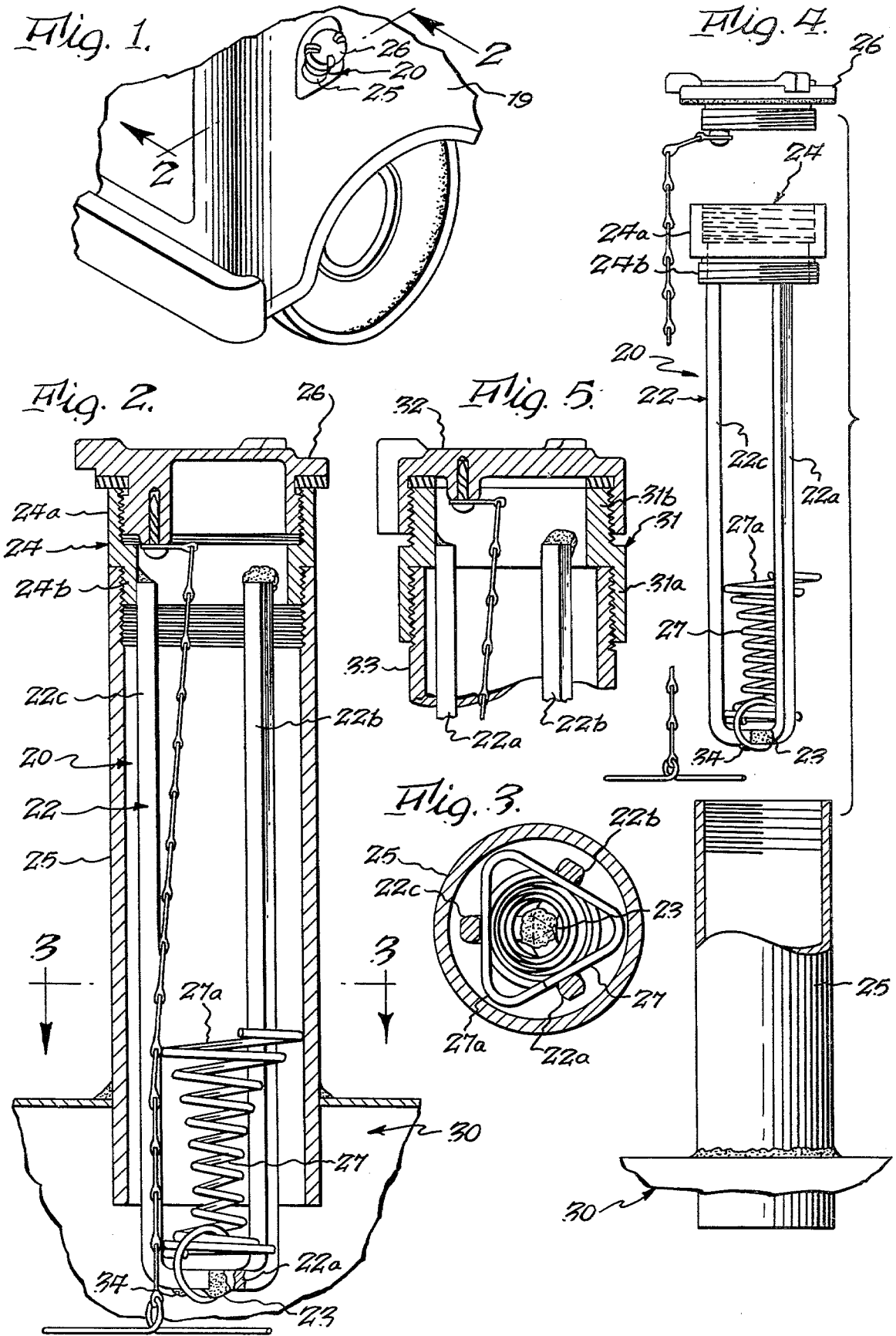

ANTI-SIPHON DEVICE

BACKGROUND OF THE INVENTION

This invention relates to an anti-siphon device for preventing the siphoning of liquid fuel from a fuel tank. More particularly, the present invention relates to an anti-siphon device for preventing the siphoning of gasoline from a gasoline tank, which device is designed for permanent installation within the fuel filler pipe of motor vehicles, especially buses and trucks.

In the past, various devices have been used for preventing the unauthorized siphoning of gasoline. One such device is illustrated by the U.S. Pat. No. 2,496,992 wherein a cone-shaped spring is attached near the outer rim of a gasoline intake or filler pipe. U.S. Pat. No. 2,017,837 discloses another type of cone-shaped spring device wherein the cone is located away from the outer rim of the filler pipe. U.S. Pat. No. 3,985,259 discloses a one-piece spring, coiled in a cylindrical shape having a lower cone shaped portion, wherein the lower end of the cone is provided with a bend so that the contiguous coil portion at the lower end of the spring projects outwardly at an angle approximately 45 degrees from the vertical axis of the device.

None of these devices, however, has been found to be entirely satisfactory for the intended purpose, as the placement of such a spring or coil arrangement within the intake opening has caused sufficient blockage of the filler pipe to impede the flow of gasoline into the tank during the filling operation. The back-flow of gasoline thus created by the location of the anti-siphon device within the filler pipe causes the spillage of a considerable quantity of fuel which is a highly undesirable result. Also, many such spring devices are flimsy and can be forced out of the filler pipe into the tank by thrusting a rod or the like into the filler pipe.

SUMMARY OF INVENTION

It is, therefore, an object of the present invention to provide a new and improved anti-siphon device or adaptor which enables a fuel tank to be filled rapidly without causing a backward flow of gasoline out of the tank.

It is a further object of this invention to provide an anti-siphon device which prevents the siphoning of gasoline, and which is theft proof, non-breakable, and essentially non-removable once installed within the filler pipe of the tank.

It is a further object of this invention to provide an anti-siphon device or adaptor which is simple and inexpensive to manufacture, easy to install, and which is permanently affixed to the fuel pipe once installation is complete.

It is a further object of the present invention to provide an anti-siphon device which may be permanently installed quickly within any conventional fuel intake pipe (filler pipe) and which readily communicates with any conventional fuel cap.

The present invention provides an anti-siphon device comprising a spring means carried by an elongated rigid supporting means which is adapted to be permanently installed within a conventional fuel filler pipe. When the device is installed within the filler pipe, the inner end of the supporting means which houses the spring is positioned such that a substantial portion of the spring lies below the end of the filler pipe, and projects inwardly into the fuel tank. This arrangement permits the rapid entry of fuel into the tank without creating any significant back-flow of fuel out of the tank.

The device also includes a hollow connecting element such as a collar fixed to the outer end of the supporting means and adapted to provide connection between a standard filler pipe and a standard gasoline cap. The spring means preferably comprises a coiled, hourglass-shaped spring, and the supporting means preferably comprises a three-prong tubular shaped cage.

The permanent installation and structural rigidity of the device advantageously prevents the unauthorized tampering, destruction or removal of the device from the filler pipe.

BRIEF DESCRIPTION OF THE DRAWING

FIG. 1 is an environmental view showing the apparatus according to this invention in actual use within a bus.

FIG. 2 is a side sectional view of the device after installation within a fuel filler pipe of a vehicle.

FIG. 3 is a partial sectional view taken along line 3—3 of FIG. 2.

FIG. 4 is a side exploded view of the device according to this invention.

FIG. 5 is a partial sectional view illustrating an alternative embodiment of the apparatus of this invention.

DETAILED DESCRIPTION OF THE DRAWING

The present invention provides an anti-siphon device adapted for permanent installation in a vehicle fuel filler pipe having an inner end in communication with the vehicle fuel tank and an outer end normally closed by a manually operable closure element, (wherein the device comprises):

(a) a hollow connector element having a formation on one axial end for connection to the outer end of the filler pipe and a formation on the opposite axial end for connection to the closure element;

(b) an elongated, rigid supporting means (fixed at one end to one axial end of the connector element) adapted to extend into and along the filler pipe, wherein the supporting means has a length such that the opposite end of the supporting means is located beyond the inner end of the filler pipe in the tank, and having an open central region extending lengthwise from one end forming a structure which allows free fluid flow along the filler pipe into the tank; and (c) a spring means carried by the supporting means in a manner such that a portion of the spring means is located within the filler pipe and a portion of the spring means is located beyond the inner end of the filler pipe in the tank, wherein the portion of the spring means within the filler pipe extends across a major portion of the cross sectional dimension of the filler pipe.

In FIG. 1, an anti-siphon device according to the present invention is generally designated 20, and is shown in actual environmental use installed within the gasoline filler pipe of a bus, 19.

Referring now to FIGS. 2, 3 and 4, the anti-siphon device 20 comprises an elongated rigid supporting means in the form of a tubular shaped, pronged cage 22 having at least three parallel prongs 22a, b and c. The bottom ends of prongs 22a, b and c are bent radially inwardly toward each other, to form an essentially flat bottom and are securely fastened at some point approximately midway between all three prongs (see 23) to form an open sided central region. At the opposite end of the device, a hollow connector element in the form of collar 24 is securely fastened to prongs 22a, b and c. Collar 24 is adapted by threading to communicate between a conventional fuel tank filler pipe 25 and a conventional fuel tank gas cap 26. The open sided central region formed by prongs 22a, b and c serves as the housing for carrying a circularly coiled, hourglass-shaped spring 27, wherein one or more of the end coils 27a located closest to collar 24, is suitably shaped to extend outwardly between each of prongs 22a, b and c (see FIG. 3).

FIG. 2 illustrates the anti-siphon device according to this invention installed within a filler pipe 25 leading to gasoline tank 30. Once the anti-siphon device is installed, a substantial portion of the bottom end of the supporting means housing spring 27 extends beyond the base or inner end of filler pipe 25 into gas tank 30. This arrangement is critical because it prevents a siphoning instrument from being lowered into the tank while the location of the spring does not significantly interfere with fuel flowing into the tank.

When installed, the anti-siphon device becomes an integral part of the filter pipe neck and adds only seven-eighths of an inch to the overall outer filler pipe length. This is especially important if the device is used in school buses, where a safety cage surrounds the fuel tank. The seven-eighths inch increase in filler pipe length is well within the protection of the tank's safety cage.

FIGS. 2 and 4 illustrate one embodiment of this invention wherein collar 24 is formed with an internally threaded upper end portion 24a and an externally threaded lower end portion 24b. The internal threads 24a are formed to communicate with one of two commonly used gas caps 26 having a standard externally threaded outer portion. The external threads 24b are designed to communicate with the internal threading located within the top of a standardly used size of filler pipe 25. Prior to installation of the device, the internally threaded pipe 25, would normally communicate directly with externally threaded gas cap 26.

The anti-siphon device as shown in FIGS. 2 and 4 may be manufactured in any width or length for installation within any size filler pipe. Typically, the filler pipes of trucks will be significantly larger than those used in buses.

The anti-siphon device is designed to provide free flow of fuel into the tank after the device is installed. In order to ensure the unimpeded flow of gas into the tank, it is important that the proper sized anti-siphon device be utilized in relation to the inside length of the filler pipe of the particular vehicle within which installation is to be made. If, however, the wrong length anti-siphon device is used, one of two situations can occur: 1. If the anti-siphon device installed is too long for the filler neck of the vehicle, no security will result, as a siphoning tube may freely pass into the tank. 2. If an anti-siphon device is selected which is too short for the filler pipe, i.e. does not extend partially below the end of the filler pipe, fuel security will be maintained, but excessive back pressure may result when filling the tank causing the automatic gas handles of a fuel pump to kick off. In both of these cases, however the safe operation of the vehicle will remain intact.

It has been determined that the three most common lengths of filler pipe used in large vehicles fall into the three following ranges: three to four inches, six to seven inches, and nine to ten inches. Accordingly, the anti-siphon device is presently manufactured in three model lengths corresponding to the above three ranges. In determining the length of the filler pipe, it is the inside length which must be measured, as part of the pipe extends down into the tank and is not visible externally. Once the inside length is known, the proper size anti-siphon device can be determined.

The length of the connector element, i.e. collar portion 24 will generally remain the same for all models. The length of the supporting means or cage housing the spring will vary to fit within one of the above three ranges. For example, it has been determined that a cage length of approximately four and one half inches (measuring from the base of collar 24 to the end of the cage) will function effectively in filler pipes wherein the internal length is between three to four inches. Of course, when this particular length of anti-siphon device is installed within a three inch length of filler pipe, relatively more of the cage will extend into the fuel tank below the filler pipe, than with a pipe having a four inch internal length. Preferably, the uppermost portion of housed spring 27 should extend upwardly into the inner end of filler pipe 25 a distance from about one-quarter inch to about one and one-quarter inches to ensure a minimum of back pressure during a filling operation.

As stated above, in most cases the dimensions of collar 24 will remain constant depending on the vehicle. Generally, school buses utilize what is known in the art as a two inch filler pipe (schedule 40 or schedule 80). Accordingly one standard size diameter collar will suffice for all such vehicles using this particular size filler pipe as standard equipment.

To install the device within the filler tank, the user removes the fuel filler cap and safety chain from the vehicle. The inside of the fuel filler pipe is inspected for any possible obstructions that might interfere with installation. On some vehicles there may be a small washer welded to the inside of the filler pipe near the bottom. It is necessary to remove such an obstruction prior to installation of the anti-siphon device. (Only non-sparking tools such as a brass rod and a lead hammer should be used for removing any obstruction to prevent possible ignition of gasoline vapors already in the tank. This is especially important when the anti-siphon device is to be installed within an older vehicle. If the anti-siphon device is being installed within a new fuel tank wherein gasoline fumes are not present, then any tools may be utilized.) The safety chain attached to the fuel cap is threaded through the top of the anti-siphon device and thereafter the fuel cap is screwed into the upper portion of collar 24a.

To facilitate a permanent bond between the anti-siphon device and the filler pipe, the device is packaged in combination with a known thread locking compound or adhesive suitable for use with gasoline. Any suitable adhesive sealant may be used provided it has sufficient solvent resistance to oil or gasoline products. The recommended sealant is LOCTITE (product number RC-680) which is manufactured by the Loctite Corporation. This adhesive is known as an anaerobic sealant (meaning without air), because it utilizes oxygen to keep the adhesive liquid in its container until applied to metal parts. An anaerobic film on any exposed surface stays liquid while in contact with air. When air is excluded by component assembly, the anaerobic resin inside the joint hardens into a tough thermoset plastic seal.

LOCTITE RC-680 has the ability to bind permanently even when used on an oily or dirty surface. This particular sealant also has the ability to fill large gaps which often occur when applying adhesive to threading. Using such an adhesive to form a permanent bond makes installation quick and easy. Of course, other means of installation could be used, as for instance, welding the anti-siphon device to the filler pipe. However, when this is done, the filler pipe must be disassembled from the gas tank as there is the danger of explosion. This type of installation is time consuming and expensive.

The adhesive should not be applied to the threads of the anti-siphon device until the user is sure that the device being used is the proper size for the filler pipe. It is advisable to screw the anti-siphon device into the filler pipe without using the adhesive making sure that the length of the anti-siphon device is in the right proportion to the inside length of the filler pipe. Once the user is sure of the proper fit, the adhesive tube is opened and the adhesive is applied generously to the mating threads of the filler pipe. It is advisable to keep the fuel cap screwed to the anti-siphon device while applying the adhesive as this will prevent the adhesive from accidentally getting into the threads of the fuel cap. For maximum strength all of the mating threads to the filler pipe should be coated with the adhesive. Thereafter, with the fuel cap and safety chain in place, the anti-siphon device is screwed on to the filler pipe and tightened securely with a pipe wrench. This completes installation.

When LOCTITE is utilized as the sealer, the bond will set usually in about thirty minutes and should harden to full strength in about six hours at room temperature. (Setting time may vary with changes in temperature.) After the bond is fully cured, the anti-siphon device is virtually permanently part of the vehicle. It is estimated that upwards of five hundred foot pounds of torque would be required to remove the anti-siphon device from the filler pipe. It is, therefore, highly unlikely that anyone attempting to siphon gas out of the tank would be able to exert such pressure using normal tools.

FIG. 5 illustrates an alternative embodiment of this invention wherein collar 31 is adapted to communicate with another commonly used gas cap construction 32. In FIG. 5, collar 31 is formed with an internally threaded lower end portion 31a and an externally threaded upper end portion 31b. This particular threading arrangement permits communication of the adaptor between a standard internally threaded gas cap 32 and a standard externally threaded filler pipe connection 33. Again, this anti-siphon embodiment may be manufactured in various sizes for use with various filler pipe diameters and lengths.

The anti-siphon device may be manufactured out of any suitable material. The preferred material is low carbon steel which has been coated with black oxide to guard against rusting. The spring or coil is fabricated out of tempered steel at least one-eighth inch in diameter. The coil is likewise coated with black oxide to prevent rusting. Once the spring is mounted within the cage, it is recommended but not essential that the spring fit essentially flush against the cage bottom.

For maximum strength, it is recommended that each prong be at least five-sixteenths inch by one-quarter inch having at least two flat sides opposite each other for ease of attachment to the collar. The upper ends of the prongs are welded to the internal non-threaded portion of collar 24 or 31. The bottom ends of the prongs are bent toward each other to form an essentially flat bottom for the cage. The ends are then welded together at a point approximately midway between all three prongs.

The hourglass shaped spring 27 is suitably sized to fit the inside of cage 22. It is preferred that spring 27 be between two inches and two and one half inches in length. The inner coils which have a smaller diameter, form an inner contiguous coil portion having an outside diameter of approximately 0.6 inches to 0.7 inches. The two outer circular end portions of the spring have a maximum outside diameter of 1.34 inches. The top coil of the hourglass spring is generally a single coil which is preferably formed into an equilateral triangular having rounded corners which is positioned such that each corner of the triangle extends outwardly through the open space between two adjacent prongs. Each straight side of the triangle fits essentially flush against each inner flat side of each prong. A second or third triangular coil may be super-imposed over the first to provide ultimate or extra protection, however, this arrangement is not critical to the operation of the device.

It is preferable to attach spring 27 to the bottom of cage 22 by using a steel ring 34 with a 1 inch side diameter formed from $\frac{1}{8}$ inch diameter, non-hardened, low carbon steel wire suitable for welding. Ring 34 is threaded through several of the lower coils of spring 27 and around one prong of cage 22. The ring is welded to the bottom of one of the prongs 22a, or b, or c. This prevents the spring from being pulled upwards. Of course, many other equivalent means are available for attaching the spring to the cage, as, for example, by spot welding, or by attachment using some suitable adhesive. However, there appears to be less likelihood of the spring breaking loose within the cage when ring structure 34 is utilized.

Once spring 27 is mounted within cage 22 the entire diameter of the combination must be of sufficient size to fit within filler pipe 25. The rounded corners of triangular shaped coil 27a will preferably extend essentially up to the inside wall of the filler pipe, but should not actually touch the wall in order to provide sufficient clearance for installation. Depending upon ordinary variations in manufacturing tolerances, one or more of the corners of coil 27a may touch the inner wall of intake pipe 25, but such direct communication is neither required nor preferred.

Cage 22 may be formed from any number of parallel prongs, but based upon economic considerations, the three prong arrangement is preferred. Of course, if more than three prongs are used, the shape of top coil 27a would be changed accordingly to provide suitable extending portions of coil between every two adjacent prongs.

The threading is formed in collar 24 or 31 by any method commonly known in the art. Once the standard thread size and depth on the corresponding gas cap and filler pipe are known, suitable complementary threading may be readily formed in either collar model.

Once permanent installation is effected, any attempt to siphon gasoline from the tank will be completely thwarted by virtue of the fact that a siphoning tube or hose cannot be inserted through or around the anti-siphoning coil apparatus located in filler pipe.

From the foregoing, it is apparent that the objects of the present invention have been fully accomplished. As a result of this invention, an improved anti-siphon device is provided for use in tanks such as fuel tanks and the like which may be easily installed within the filler pipe of the vehicle and which provides maximum protection from siphoning gasoline out of the tank. In addition, the design of this device permits fast and efficient filling of the fuel tank and eliminates or greatly reduces the occurrence of spillage or waste of fuel due to back flow of the fuel during a filling operation. The selection of the proper sized anti-siphon device to fit an existing vehicle filler pipe provides maximum security and ease of refueling.

While the foregoing has set forth the preferred embodiments of the present invention, it is to be understood that all similar embodiments which would be obvious to those skilled in the art, or which would be equivalent to those disclosed herein, are intended to be included within the scope of the claimed invention.

I claim:

1. An anti-siphon device adapted for permanent installation in a vehicle fuel filler pipe having an inner end in communication with the vehicle fuel tank and an outer end normally closed by a manually operable closure element, said device comprising:
   (a) a hollow connector element having a formation on one axial end for connection to said outer end of said filler pipe and a formation on the opposite axial end for connection to said closure element;
   (b) an elongated, rigid supporting means having one end fixed to said connector element, adapted to extend into and along said filler pipe, said supporting means having a length such that the opposite end of the supporting means is located beyond the inner end of said filler pipe in said tank, said supporting means having an open central region extending lengthwise from said one end forming a structure which allows free fluid flow along said filler pipe into said tank; and
   (c) a spring means carried by said supporting means in a manner such that a portion of said spring means is located within said filler pipe and a portion of said spring means is located beyond said inner end of said filler pipe in said tank, said portion of said spring means within said filler pipe extending across a major portion of the cross sectional dimension of said filler pipe.

2. The apparatus of claim 1, wherein said supporting means comprises a tubular shaped cage including at least three essentially parallel longitudinally extending prongs spaced apart approximately equidistantly, wherein the inner ends of said prongs are bent radially inwardly and securely fastened to each other at a point essentially midway between said prongs.

3. The apparatus of claim 1, wherein said connector element comprises a tubular shaped collar securely fastened to the upper end of said prongs, which collar has threads adjacent said axial ends whereby said connector is adapted to communicate between a standard filler pipe and a standard gasoline cap.

4. The apparatus of claim 1, wherein said spring means comprises a circularly coiled hourglass shaped spring adapted to be housed completely within said supporting means.

5. The apparatus of claim 2, wherein said spring means has at least one end coil shaped to protrude outwardly into the open space located between any two adjacent prongs.

6. The apparatus of claim 1, wherein said spring means is fixed to said supporting means.

7. The apparatus of claim 2, wherein said cage is comprised of three essentially parallel longitudinal prongs.

8. The apparatus of claim 5, wherein said end coil is located on the end of the hourglass shaped spring nearest the collar.

9. The apparatus of claim 8, wherein said protruding end coil is shaped to form essentially an equilateral triangle having rounded corners.

10. The apparatus of claim 9, wherein once the apparatus is completely installed within a filler pipe, the bottom portion of said cage housing the spring extends downward into the gasoline tank beyond the bottom end of the filler pipe.

11. The apparatus of claim 10, wherein said hourglass shaped spring is adapted to be securely fastened to the bottom most portion of said cage.

12. The apparatus of claim 11, wherein once installation within a filler pipe is complete, the uppermost portion of a spring housed within said cage extends upwardly into the inner end of said filler pipe a distance from about one-quarter inch to about one and one-quarter inches.

13. The apparatus of claim 12, wherein said anti-siphon device is adapted for communication between a standard filler pipe and a standard gas cap by complementary threading.

14. The apparatus of claim 13, wherein said anti-siphon device is adapted for permanent installation by the utilization of a suitable adhesive which is essentially non-reactive to the fuel normally present in said tank.

15. The apparatus of claim 1, further including means for permanently joining said connector element to said filler pipe.

16. The apparatus of claim 15, wherein said joining means comprises a suitable adhesive essentially non-reactive to the fuel normally present in said vehicle tank.

17. An anti-siphon device adapted for permanent installation in a vehicle filler pipe having an inner end in communication with the vehicle fuel tank and an outer end normally closed by a manually operable closure element, said device comprising:
   (a) an elongated rigid supporting unit having one end in neighboring relation to said outer end of said filler pipe and adapted to extend into and along said filler pipe, said supporting means having a length such that the opposite end of said supporting means is located beyond the inner end of said filler pipe in said tank, said supporting means having an open central region extending lengthwise from said one end forming a structure which allows free fluid flow along said filler pipe into said tank; and
   (b) means for joining said one end of said supporting means to said filler pipe; and
   (c) spring means carried by said supporting means in a manner such that a portion of such spring means is located within said filler pipe and a portion of said spring means is located beyond said inner end of said filler pipe in said tank, said portion of said spring means in said filler pipe extending across a major portion of the cross-sectional dimension of said filler pipe.

18. The apparatus of claim 17, wherein said supporting means comprises a tubular shaped cage including at least three essentially parallel longitudinally extending prongs spaced apart approximately equidistantly, wherein the inner ends of said prongs are bent radially inwardly and securely fastened to each other at a point essentially midway between said prongs.

19. The apparatus of claim 18, wherein said spring means comprises a circularly coiled hourglass shaped spring adapted to be housed completely within said supporting means.

20. The apparatus of claim 19, wherein said spring means has at least one end coil shaped to protrude outwardly into the open space located between any two adjacent prongs.

* * * * *